Patented Mar. 9, 1926.

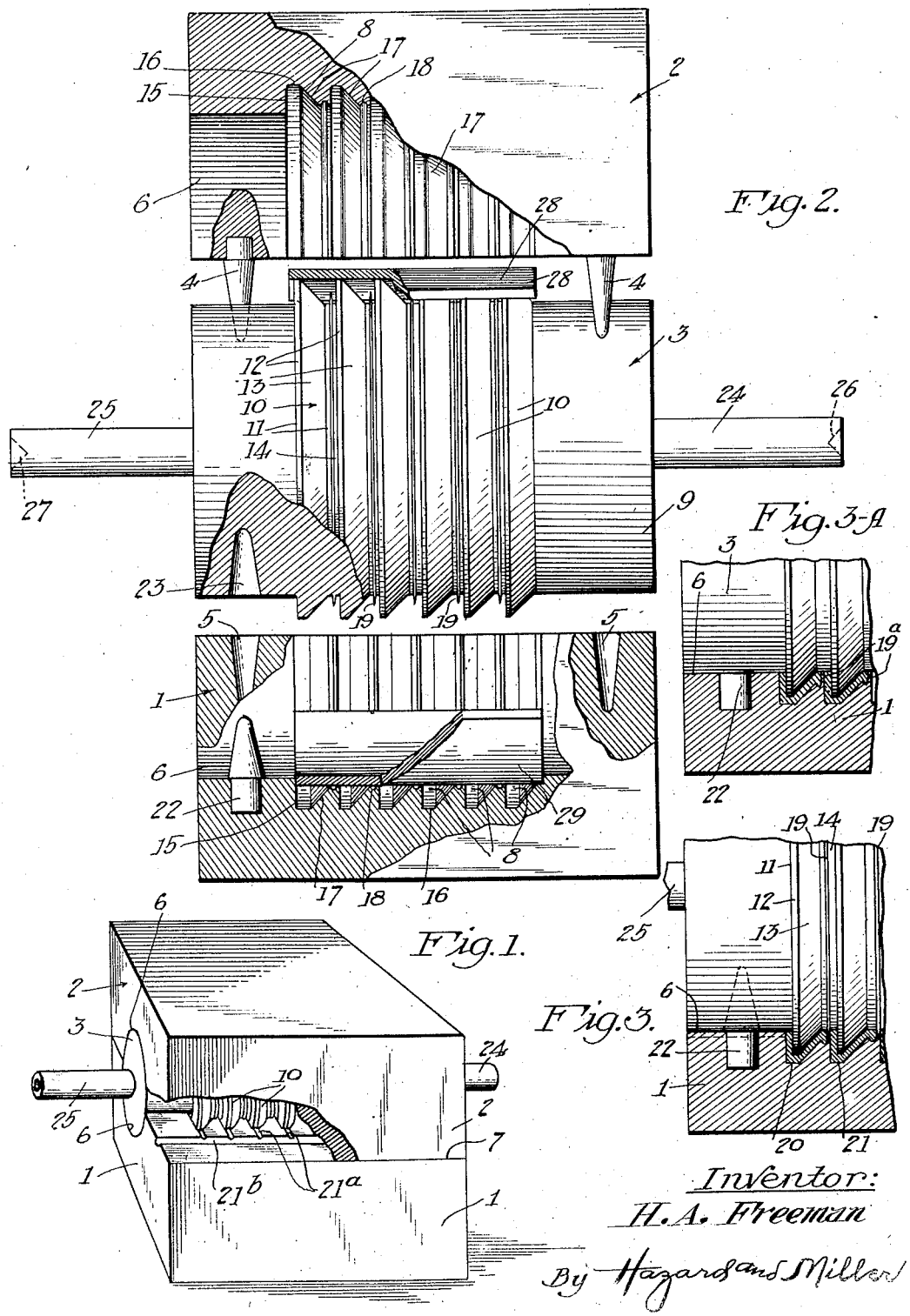

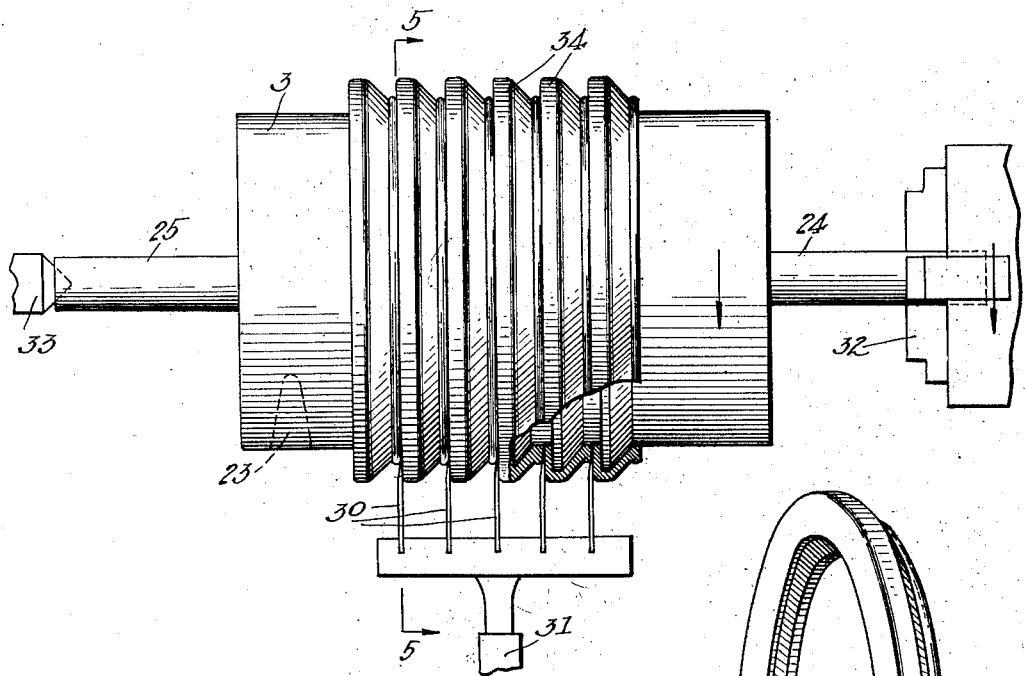
Fig. 4.
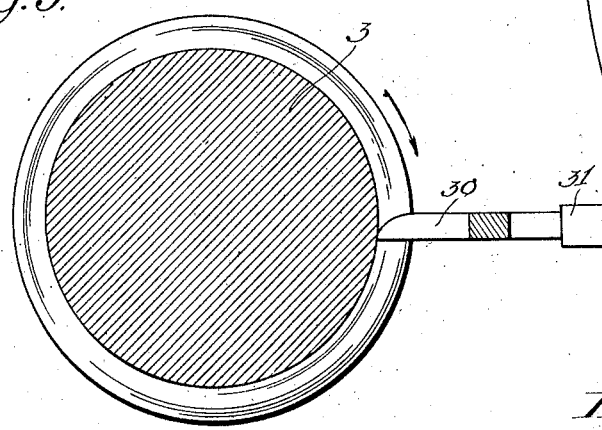
Fig. 5.
Fig. 6.

1,576,184

UNITED STATES PATENT OFFICE.

HAROLD A. FREEMAN, OF LOS ANGELES, CALIFORNIA.

MOLD FOR MAKING RUBBER GOODS.

Application filed April 10, 1924. Serial No. 705,539.

*To all whom it may concern:*

Be it known that I, HAROLD A. FREEMAN, a citizen of the United States, residing at Los Angeles, in the county of Los Angeles and State of California, have invented new and useful Improvements in Molds for Making Rubber Goods, of which the following is a specification.

My invention relates to molds for making rubber goods, and consists of the novel features herein shown, described and claimed.

An object is to make a mold that will produce a plurality of articles ready for separation.

A specific object is to make a mold for producing a plurality of shock absorbing rings for the bases of portable telephone instruments and the like, and to make the rings so that they may be readily separated.

Another object is to partially or entirely eliminate the trimming process or operation.

Other objects and advantages will appear from the drawings and specification.

The drawings illustrate the mold and the operation for producing the shock absorbing rings.

Figure 1 is a perspective of the mold assembled for the vulcanizing process.

Fig. 2 is a view in elevation upon an enlarged scale and showing the mold and core about to go together, parts being broken away and shown in section.

Fig. 3 is a fragmentary sectional detail of the mold, core and rubber assembled as at the completion of the vulcanizing process.

Fig. 3ᴬ is a fragmentary sectional detail similar to Fig. 3 and showing a modification.

Fig. 4 is a view in elevation showing the core carrying the vulcanized rings in a lathe and a tool for separating the rings.

Fig. 5 is a cross section on the line 5—5 of Fig. 4.

Fig. 6 is a perspective of a shock absorber ring separated from the other rings and removed from the core.

The details of the features shown in the drawings are as follows:

The mold consists of a lower section 1, an upper section 2, and a core 3. The sections 1 and 2 are rectangular blocks, there being dowels 4 fixed in the section 2 and adapted to fit in dowel holes 5 extending from the upper face of the section 1. The sections 1 and 2 are placed together with the dowels 4 in the dowel holes 5, and a bore 6 is formed straight through the sections 1 and 2, the center of the bore being the parting line 7 between the sections. Then the intermediate portions of the bore 6 are tooled or milled to produce a plurality of ring pockets 8 extending outwardly from the bore 6 and concentric to the axis.

The core 3 has a straight cylindrical body 9 with a plurality of annular flanges 10 spaced apart and adapted to fit loosely in the pockets 8, each flange having a straight side 11, a narrow straight periphery 12, a beveled side 13, and a neck 14, as required to form the inner side of a shock absorbing ring. Each pocket 8 has a straight side 15, a rounded inner peripherial face 16, an inclined side 17, and a bead forming groove 18. The straight side 11 of the flange is spaced from the straight side 15, the periphery 12 is spaced from the rounded portion 16, the inclined side 13 is spaced from the side 17, and the neck 14 is spaced from the bead groove 18, so that the rubber will flow around in the flange 10 and be substantially of even thickness, as shown in Fig. 3. An annular cutter ring 19 extends outwardly from the neck 14 in a plane between the bead groove 18 of one pocket 8 and the straight face 15 of the next pocket 8, so as to cut the rubber forming the ring 20 from the rubber forming the next ring 21, and so on.

Referring to the modification shown in Fig. 3ᴬ, the annular cutter ring 19ᵃ projects inwardly along side the bead groove 18 and between the bead groove 18 of one pocket 8 and the straight face 15 of the next pocket 8, so as to separate the rings 20, 21 and so on.

Either cutter ring 19 or 19ᵃ may be used, and either may be made to produce a partial or a complete separation of the rubber rings.

When the cutter rings 19 or 19ᵃ are used each ring pocket 8 is more or less isolated when the mold is completely closed and the rubber must flow more or less around the core in the pockets. Vents 21ᵃ are formed in the upper face of the section 1 and lead outwardly from the pockets 8 to a common vent 21ᵇ.

Dowels 22 are fixed in the section 1 at the bottom of the bore 6 outside of the flanges 10 to engage in dowel holes 23 in the core so as to mount the core so as to center the flanges 10 in the pockets 8. Spindles 24 and 25 extend from the ends of the cylindrical body 9 and have lathe centers 26 and 27 in their ends. There may be any desired number of ring pockets and flanges in a mold and the pieces of gum rubber 28 and 29 are cut as near as possible to contain the right amount of rubber and the piece 29 is placed in the lower section 1 and the piece 28 is placed upon the core as shown in Fig. 2. Then the core is lowered into engagement with the section 1 and the section 2 is lowered into engagement with the core and the parts are clamped together, heat is applied and the rubber vulcanized.

After the rubber has been vulcanized, the mold is opened and the rubber rings are upon the core 3 and nearly or completely separated from each other by the annular cutter rings 19 or 19ª, or, if the cutter rings have not been used, the rubber rings are united.

The rubber is comparatively soft and elastic, and if the cutter rings have been used the rubber rings may be torn apart and stretched and removed from the core.

If the cutter rings have not been used to completely separate the rubber rings, the core carrying the rings may be placed in a lathe and a cutter having one or more knives 30 carried by a tool post 31 may be advanced to engage in the recesses formed by the cutter rings or in the planes where the cutter rings would be to completely separate the rubber rings. When the core is placed in a lathe, one spindle, as 24, is placed in the chuck 32, and the other spindle, as 25, is placed on the lathe center 33. After the lathe operation, the rubber rings 34 may be stretched and removed from the core.

While I have shown and described the mechanism and operation of producing rubber rings channel shaped in cross section, it is to be understood that other forms of rubber goods may be produced, and that while I have shown the shape of the mold as rectangular is cross section and the shape of the core as round in cross section, it is to be understood that other cross sections may be of any desired or preferred shape.

Various changes may be made without departing from the spirit of my invention as claimed.

I claim:

1. A mold for forming and vulcanizing rubber goods comprising means forming annular pockets, a circular core having flanges extending into the pockets, the pockets being shaped to form the outer side of the articles and the core being shaped to form the inner side of the articles, the pockets being side by side so as to produce a plurality of the articles surrounding the core, and adapted to be separated.

2. A vulcanizing mold comprising a lower section, an upper section, means for holding the sections in registration, there being an axial bore through the two assembled sections centered on the parting line, and pockets extending outwardly from the bore, each pocket being adapted to contain an article, a core fitting the bore and pockets and spaced from the inner facing of the pockets, means for centering the core, and means between the pockets for separating the vulcanized articles.

3. A vulcanizer comprising a lower section, an upper section, means for holding the sections in registration, there being a cylindrical bore through the assembled sections centered on their abutting faces, there being annular pockets formed in the opposed faces of said sections about said bore intermediate its ends, each pocket being adapted to contain an article, and a core having cylindrical ends adapted to fit against the cylindrical surfaces at the ends of said bore, said core having annular flanges greater in diameter than the diameters of its ends, and which extend into said pockets but are in spaced relation to the surfaces thereof, so as to form the interior surfaces of the articles.

In testimony whereof I have signed my name to this specification.

HAROLD A. FREEMAN.